(12) United States Patent
Thompson et al.

(10) Patent No.: US 7,920,088 B2
(45) Date of Patent: Apr. 5, 2011

(54) APPARATUS AND METHOD TO IDENTIFY TARGETS THROUGH OPAQUE BARRIERS

(76) Inventors: Scott Randall Thompson, Hermosa, SD (US); Bernt A Askildsen, Rapid City, SD (US); Anthony Gervasi, Rapid City, SD (US)

( * ) Notice: Subject to any disclaimer, the term of this patent is extended or adjusted under 35 U.S.C. 154(b) by 757 days.

(21) Appl. No.: 11/308,029

(22) Filed: Mar. 3, 2006

(65) Prior Publication Data

US 2007/0205937 A1 Sep. 6, 2007

(51) Int. Cl.
*G01S 13/04* (2006.01)
*G01S 7/483* (2006.01)
*G01S 13/10* (2006.01)
*G01S 7/00* (2006.01)

(52) U.S. Cl. ............. 342/90; 342/21; 342/22; 342/25 R; 342/27; 342/89; 342/118; 342/134; 342/135; 342/159; 342/175; 342/195; 342/196

(58) Field of Classification Search ............... 342/21, 342/22, 27, 28, 59, 82, 89–90, 118, 128–132, 342/134, 135, 159, 175, 176, 179, 192–197, 342/25 R–25 F, 136–145, 160–164; 324/600, 324/629, 637–646
See application file for complete search history.

(56) References Cited

U.S. PATENT DOCUMENTS

| | | | | |
|---|---|---|---|---|
| 3,978,480 A | * | 8/1976 | Tsuruta et al. | 342/90 |
| 4,896,116 A | | 1/1990 | Nagashima | |
| 4,942,360 A | | 7/1990 | Candy | |
| 4,972,193 A | * | 11/1990 | Rice | 342/90 |
| 4,992,797 A | * | 2/1991 | Gjessing et al. | 342/192 |
| 5,337,053 A | * | 8/1994 | Dwyer | 342/90 |
| 5,341,142 A | | 8/1994 | Reiss | 342/64 |
| 5,504,487 A | * | 4/1996 | Tucker | 342/90 |
| 5,552,705 A | | 9/1996 | Keller | |
| 5,612,700 A | * | 3/1997 | Tucker | 342/90 |
| 5,757,309 A | * | 5/1998 | Brooks et al. | 342/90 |
| 5,867,118 A | * | 2/1999 | McCoy et al. | 342/90 |
| 5,963,035 A | | 10/1999 | Won | |
| 6,243,036 B1 | | 6/2001 | Chadwick et al. | 342/27 |
| 6,335,624 B1 | | 1/2002 | Berthier et al. | |

(Continued)

OTHER PUBLICATIONS

G. Linde, "Use of Wideband Waveforms for Target Recognition with Surveillance Radars"; "Radar Conference 2000, The Record of the IEEE 2000 International"; pp. 128-133; Published May 7-12, 2000; Alexandria, Virginia; ISBN 0-7803-5776-0.*

*Primary Examiner* — Bernarr E Gregory

(57) ABSTRACT

The present invention is a method and apparatus that provides detection, characterization, and intuitive dissemination of targets. This disclosure combines improvements to ultra-wideband (UWB) sensing and machine target characterization with a means to convey data in a format that is quickly and readily understood by practitioners of the technology. The invention is well suited for Situational Awareness (SA) support in areas that are occluded by rain, fog, dust, darkness, distance, foliage, building walls, and any material that can be penetrated by ultra-wideband RF signals. Sense Through The Wall (STTW) performance parameters including target range, stand-off distance, and probability of detection are improved herein by combining a dynamically positioned sliding windowing function with orthogonal feature vectors that include but are not limited to time amplitude decay, spectral composition, and propagation time position in the return signal data. This invention is particularly useful for STTW and SA applications including urban combat, law enforcement, fire protection, transportation security, and homeland security. The invention can also be used to detect objects that are concealed by clothing, debris, and other non-metallic materials.

61 Claims, 11 Drawing Sheets

U.S. PATENT DOCUMENTS

| | | | |
|---|---|---|---|
| 6,359,582 B1 | 3/2002 | MacAleese et al. | 342/22 |
| 6,366,232 B1 * | 4/2002 | Liedtke et al. | 342/22 |
| 6,437,728 B1 * | 8/2002 | Richardson et al. | 342/90 |
| 6,480,141 B1 | 11/2002 | Toth et al. | 342/22 |
| 6,577,269 B2 | 6/2003 | Woodington et al. | |
| 6,720,905 B2 * | 4/2004 | Levitan et al. | 342/22 |
| 6,791,487 B1 * | 9/2004 | Singh et al. | 342/22 |
| 6,801,155 B2 * | 10/2004 | Jahangir et al. | 342/90 |
| 6,806,821 B2 | 10/2004 | McLemore | 342/22 |
| 6,809,520 B1 | 10/2004 | Nelson | |
| 6,853,194 B2 | 2/2005 | Nelson et al. | |
| 6,856,272 B2 * | 2/2005 | Levitan et al. | 342/22 |
| 6,894,639 B1 | 5/2005 | Katz | 342/90 |
| 6,950,054 B1 | 9/2005 | Steinway et al. | 342/22 |
| 6,967,574 B1 | 11/2005 | Nelson | |
| 6,967,612 B1 | 11/2005 | Gorman et al. | 342/22 |
| 6,970,128 B1 * | 11/2005 | Dwelly et al. | 342/25 F |
| 2004/0041724 A1 * | 3/2004 | Levitan et al. | 342/22 |
| 2004/0056790 A1 * | 3/2004 | Lovberg et al. | 342/22 |
| 2004/0174289 A1 * | 9/2004 | Singh et al. | 342/22 |
| 2004/0183712 A1 * | 9/2004 | Levitan et al. | 342/22 |
| 2006/0036353 A1 * | 2/2006 | Wintermantel | 342/90 |

* cited by examiner

APPARATUS AND METHOD TO IDENTIFY TARGETS THROUGH OPAQUE BARRIERS

CROSS REFERENCE TO RELATED APPLICATIONS

This application is related to co-pending U.S. patent application Ser. No. 11/964,041, filed Dec. 26, 2007 and titled "Method and Apparatus to Display Actionable Radar Targets and Target Environments", which claims the benefit of priority under 35 U.S.C. 119(e) to provisional application No. 60/871,859 filed Dec. 26, 2006 and titled "Method and Apparatus to Display Target Environments from Sense-Through-The-Wall Radar Data". Related U.S. patent application Ser. No. 11/964,041 further claims the benefit of priority under 35 U.S.C. 120, to related U.S. patent application Ser. No. 11/164,173, filed Nov. 14, 2005, now U.S. Pat. No. 7,339,516, issued Mar. 4, 2008 and titled "Method to Provide Graphical Representation of Sense Through The Wall (STTW) Targets" and further claims benefit of priority under 35 U.S.C. 119(e) to provisional application No. 60/595,870 filed Aug. 11, 2005 and titled "Method to Provide Graphical Representation of STTW Targets"; all of which are incorporated herein by reference.

DESCRIPTION

1. E. F. Greneker, J. L. Geisheimer, et al, "Development of Inexpensive Radar Flashlight for Law Enforcement and Corrections Applications, Summary of Findings," The National Institute of justice, Contract Number 98-DT-DX-K003, April 2000.
2. Crumb, F., "ARFL Developing Technology to Help Military, Law Enforcement See through Walls," AFRL-IF News Release, ARFL-R 03-09 Jan. 27, 2003.
3. Pordage, P., Gale, C., "Through-Wall Vision Technology Promises Edge for Security and Emergency Personnel," Cambridge Consultants, Jun. 17, 2003.
4. Duncan, H., "Radar Promises Through-Wall Vision for Military and Emergency Services," Microwave Engineering, Jun. 19, 2003.
5. Geisheimer, J., Greneker III, E. F., "Remote Detection of Deception Using Radar Vital Signs Monitor Technology, IEEE 34th Annual 2000 International Carnahan Conference on Security Technology, pp 170-173, Ottawa Canada, Oct. 23-25, 2000.
6. Greneker, E. F., "Radar Sensing of Heartbeat and Respiration at a Distance with Security Applications," Proceedings of the SPIE, Radar Sensor Technology II, Volume 3066, pp 22-27, April 1997.
7. Hunt, A., Tillery, C., and Wild, N., "Through-the-Wall Surveillance Technologies," Corrections Today, Vol. 63, No. 4, July 2001.
8. Dash, G., "Giza Ground Truth: Magnetic Anomaly Surveying by Glen Dash," Giza Plateau Mapping Project, AERAGRAM Magazine, http://www.fas.harvard.edu/~aera/, Feb. 12, 2002.
9. A. J. Gervasi, J. M. Weiss, B. Askildsen, and S. Thompson, "Advances In Human Target Detection Using Opaque Material Penetrating Radar Data", 20th International Conference on Computers and Their Applications (CATA-2005), Mar. 16-18, 2005.
10. Erdogmus, D., et al., "Linear-Least-Squares Initialization of Multilayer Perceptrons through Back-Propagation of the Desired Response," IEEE Transactions on Neural Networks, pp 325-337, Volume: 16, Issue: 2, March 2005.
11. J. M. Weiss, C. Hartsel, B. Askildsen, and S. Thompson, "Human Target Detection Using Noninvasive Penetrating Radar," 19th International Conference on Computers and Their Applications (CATA-2004), pp 233-236, March 2004.
12. Yen, L.-K.; Principe, J. C.; Xu, D., "Adaptive target detection in UWB images using Laguerre network," International Conference on Neural Networks, Volume 4, pp 2072-2075 vol. 4, Jun. 9-12, 1997.
13. Yavuz, M. E., "Frequency Dispersion Compensation in Time Reversal Techniques for UWB Electromagnetic Waves," IEEE Geoscience and Remote Sensing Letters, Vol. 2, No. 2, p. 233, April 2005.
14. T. K. Sarkar, Briefing, "Target ID Using Half Fourier Transform," CEM Lab, Syracuse University, Fall 2000.
15. R. P. Lippmann, "Pattern Classification Using Neural Networks," IEEE Communications Magazine, 0163-6804/0011-0047, pp. 47-67, April 1987.
16. R. P. Lippmann, "An Introduction to Computing with Neural Nets", IEEE ASSP Magazine, 0740-7647/87/0400-004, pp. 4-22, April 1987.
17. Bishop, C., "Neural Networks for Pattern Recognition," Oxford University Press, 1995.
18. Friedman, M., Kandel, A., "Introduction to Pattern Recognition: Statistical, Structural, Neural And Fuzzy Logic Approaches," World Scientific, 1999.
19. K. Hornik, M. Stinchcombe and H. White, "Multilayer Feed-Forward Networks are Universal Approximators," Neural Networks, vol. 2, no. 5, pp. 359-366, 1989.
20. Amert, T., Wolf, J., Albers, L., Palecek, D., Thompson, S., Askildsen, B., Whites, K. W., "Economical Resistive Tapering of Bowtie Antennas," IEEE Antennas and Propagation Society Symposium, ISIU RSM, Monterey, Calif., Page(s): 1772-1775, Jun. 20-25, 2004.

BACKGROUND OF THE INVENTION

The complex problem of accurately classifying concealed human and other tactical targets is getting increasing attention in response to the relentless effort by the U.S. government to fight terrorism and urban conflicts around the world. Owing to a growing number of military conflicts in urban areas and modern rules of engagement that often preclude the use of wide area offensive tactics, an increased risk faces modern dismounted U.S. and allied forces. Across the globe military and law enforcement personnel are injured or killed each year because they lack the ability to track opposing threats through walls, darkness, dust, fog, debris, opaque barriers, large distances, and intentional concealment. It is well understood that a easy to use, dismounted portable, sense through the wall (STTW) technology is needed. To be fully useful, the sensor should operate in all weather conditions from a safe standoff distance.

The most promising evolving STTW platforms that at least partially address this challenge employ magnetic anomaly, electromagnetic (EM), and ultrasound sensing schemes [1-7]. The former is well suited for through wall detection of large weapon sized quantities of moving metallic objects; however, magnetic detection is easily defeated by ferric clutter near the target [8]. EM sensing is able to penetrate most building materials and openings through doors and windows and yet this technology does not penetrate metal walls. Ultrasound has the advantage of penetrating metallic materials; however this platform must be rigidly mounted against the wall and the platform employs audible thuds that are readily detected and located by the enemy.

A growing number of evolving high frequency UWB approaches detect nearly stationary human targets through thin walls by exploiting subtle time domain distortions in the signal that are caused by eye blinking or subtle movements of the thorax [1-7]. The effectiveness of these schemes is limited by the burden that the slightest motion of the target or operator (such as rocking body or hand motion) places on the receiver. Owing to a proportional introduction of phase noise that is 20 to 30 dB higher than the desired signal, any motion of the sensor or the target tends to interfere with the radar's function. Accordingly, high false alarm rates are reported unless the target is very still and the sensor is mounted to the wall or on a fixed tripod [7].

Like the present invention and numerous approaches in the literature [9-13], select disclosers in the below listed prior art improve on the foregoing by characterizing components of the returned signal that are less impacted by movement such as relative increases or decreases in signal amplitude and spectral peaks. Amplitude changes and spectral composition in the returned signal have the most utility for target discrimination in ultra-wideband sensor data because of phase jitter that is introduced by the oscillator in most conventional UWB high-speed sampling receivers. Frequency detection algorithms in particular are more widely used because they have been shown to provide the best combination of low false alarm and high probability of detection rates.

The most common threads among the present disclosure, other publications, and related prior art include the use of transceivers to transmit and receive signals, time averaging to improve signal to noise ratio (SNR), windowing functions to localize feature information, automatic target recognition methods to differentiate objects of interest from background clutter, and various types of displays to report a detected target. For example Yavuz publicly discloses the use of Hamming windows to suppress clutter in the vicinity of atmospheric targets in UWB sensor data [13]. Yavuz employs 5 fixed windows that are placed over areas of interest in the sampled signal. This approach does not scan the entire target echo and does not dynamically alter the position of the windowing function when a dielectric or other opaque occlusion distorts the time-domain signature of the target.

U.S. Pat. Nos. 6,809,520, 6,853,194, and 6,967,574, 5,552,705, disclose systems and methods that employ time domain amplitude signature recognition techniques to identify buried metallic targets. These patents disclose methods that employ pick-up coils, variable inductance antennae, and multimode impulse and frequency domain transceivers to transmit and collect electromagnetic energy; and characterization of eddy currents and time-domain amplitude decay in the returned energy to identify each target. These patents, which are intended largely for metal detection, use processor elements or stored data that serves prior reference signatures to support characterization. Similar time decay techniques are used by Toth, et al., in U.S. Pat. No. 6,480,141, which relies on the attenuation, retardation, time delay, or phase shift of microwave radiation that is reflected off of a contraband target that is hidden in a container.

Other approaches to target identification and characterization include a method disclosed in U.S. Pat. No. 6,801,155, which employs a Hidden Markov Model to characterize a sequence of Doppler radar returns; U.S. Pat. No. 5,341,142, which uses 3 independent target acquisition algorithms to acquire targets from a focal plane array seeker; U.S. Pat. No. 5,963,035, which discloses a method that employs electromagnetic induction spectroscopy and lookup tables to identify radar targets; and U.S. Pat. No. 6,335,624, which employs look up tables to characterize subsurface targets in EM ground probing radar sensor data.

U.S. Pat. No. 6,950,054 describes a method and apparatus that is intended specifically to search for concealed objects on individuals at close range by analyzing changes in the portion of the RF signal that is effected by an object being placed between the clothing and the skin. Owing to the intended spirit of the invention, the method disclosed in U.S. Pat. No. 6,950,054 employs high frequencies to search for small objects that are obscured only by clothing and lightly attenuative materials. The embodiments that are claimed therein are based largely on the characterization of a first dielectric, which is the human body, and a second dielectric, which represents the target. An audible alarm is activated whenever a concealed object that belongs to a pre-determined target group is discovered. A similar signal difference approach to support concealed object detection on a person at close range is disclosed by Chadwick in U.S. Pat. Nos. 6,243,036 and 6,342,696. These disclosures employ a method that characterizes differences between levels of polarized energy in the time domain. In one preferred embodiment of U.S. Pat. No. 6,950,054, the sampled signal is processed using a Fast Fourier Transform (FFT) to separate a first signal, which is generated by a target, from a second signal, which is generated by the human body. U.S. Pat. No. 6,967,612 uses a similar method that employs a polarized radar system to detect hidden targets at ranges of up to 200 m by comparison of energy differences between co-polarized and cross-polarized reflections from a concealed object to a reference value of similar targets.

U.S. Pat. No. 6,806,821 describes an ultra-wideband transmitter, antenna array, and hardware device that processes time-slices of returned signals into coordinates and compares the same with the coordinates of known objects in a pre-existing database. The device provides rapid and certain detection of objects of interest through walls and other opaque barriers provided that the targets are stored in a data processing device a priori. The coordinates of the processed return signals are compared to coordinates of known objects in a pre-existing database to determine whether there is a match between the return signal and a known object. The probability of detection is determined by the magnitude of the distance between the center of a target volume in an N dimensional feature space, which can be expressed by a Half Fourier Transform [14], and that of a known object of interest. A small magnitude indicates a high probability of target detection. Like most UWB sensing systems, McLemore uses a radiating pulse with a sharp rising edge whose rise time is roughly 100-500 picoseconds and whose fall-time is roughly 5 nanoseconds. U.S. Pat. No. 6,806,821 uses a transmit array that delivers an electromagnetic field on the order of 5-7 kilovolts/meter and a receiving dish that has a diameter on the order of 1 meter.

U.S. Pat. No. 6,856,272 describes a method and apparatus for early detection of threats that employs dynamic threshold generation from the received signals to determine if a potential threat exists. Time weighted average of reflected energy in individual cells in the sample space is used to generate thresholds in each corresponding analysis period. If the threshold exceeds a pre-determined value, an alarm is reported. Threats may include concealed weapons, roadside bombs, or other weapons.

U.S. Pat. No. 6,359,582 describes a weapons detector and method utilizing short pulse radar that is stepped or swept-chirped over a set of frequencies. The radar first enters a range finder mode to determine the distance between the radar and the target. The received signal is subsequently range gated and converted into an intermediate frequency (IF) signal. While this approach is suitable for narrow stepped frequency approaches, current portable wideband solutions do not adequately discern phase in a digitized sample. Owing to the strong reliance on a priori knowledge of target resonances; the method disclosed in U.S. Pat. No. 6,359,582 precludes the capacity to send data to a process or method that can be used to characterize weapons that are outside of a pre-determined resonant frequency set. Moreover, the transmitter and receiver cannot be broadband as this precludes distinguishing among resonant frequencies.

U.S. Pat. No. 6,577,269 discloses an invention that is generally intended to identify the range between a target and the sensor. The invention uses a difference signal method that employs an FFT to provide an output signal. A derivative of the FFT output signal is computed and the object is detected in response to a zero crossing of the same. The range to the object is determined by the frequency at which the zero crossing of the FFT output signal occurs. In one embodiment, the derivative is a second derivative. The invention also includes a look-up table that contains a plurality of indicators that can asses the presence of absence of an object in a specific proximity to the radar system.

Nagashima, et al., describe a device and method that employs SAR techniques to detect and identify targets that are buried underground. In U.S. Pat. No. 4,896,116 a scan is effected by moving the transmitting and receiving antennas in one direction to obtain an underground cross-sectional area that appears along the scanning direction. The area is reconstructed by synthetic aperture processing to arrive at a signal in the vicinity of the target. The resulting observation is incrementally scanned and analyzed by a zero-crossing window over each segment of the signal. Each separated waveform is converted into a frequency region by a FFT to determine its spectral distribution. The frequency, amplitude, and DC component of the strongest spectral peak are used to compute a DC component ratio. If the DC component ratio falls within a certain range, the echo is treated as a target, otherwise it is returned as a spurious echo.

This disclosure supersedes prior art in part by specifying a system that reliably detects, characterizes, and intuitively displays any plurality of mobile and stationary objects of interest that are found in ultra-wideband sensor data. This invention addresses the foregoing in part by employing wide sensor bandwidth and feature vectors that do not rely on incremental operating frequencies or the differences between individual dielectrics to discern objects of interest from background clutter. Automatic target recognition (ATR) performances is further improved in this invention by using both dielectric and conductivity information to construct each feature vector. The disclosed invention also improves prior art by eliminating range gating methods that limit the portion of the returned signal that is analyzed for signal anomalies to a narrow region that is near a specific background clutter object such as a human subject. While analyzing the complete radar return, this invention uses amplitude peaks in the time-domain signature to dynamically position the windowing function as it is slid through the signal. Look-up tables that impede the capacity to identify targets without a priori knowledge and subtle motion detection schemes that place an excessive burden on the receiver are also obviated by this invention.

SUMMARY OF THE INVENTION

The disclosed invention is a method and apparatus for discriminating objects of interest from background clutter; particularly in environments where the desired target is occluded by walls and other opaque barriers. In an optimal embodiment of this invention, a sliding windowing function analyzes every portion of the radar signal. Time amplitude peaks in the radar return signature are used to dynamically position the windowing function as it is slid through the signal. This increases the likelihood that the entire portion of the signal that is distorted by the target is encompassed by the windowing function. A sufficiently small increment is used to ensure windowing function overlap throughout the entire reflected signal analysis. Characterization is further improved by capitalizing on the impact that distance between the sensor and the target has on the spectral composition and time amplitude decay of the energy in each windowing function. Both serve as orthogonal feature vector components that are combined uniquely by this invention with the dynamically selected time position of the windowing function in the reflected radar return to simultaneously improve false alarm mitigation and probability of detection rates.

Feature information is extracted from each windowing function and provided as input to an ATR method and apparatus. The ATR reports the probability that each feature vector contains one or more objects of interest that belong to any plurality of target classes. In the preferred method, output from the ATR is provided to an interpreter that selects an image that intuitively represents the target so that information about the detected object can be recognized promptly by a practitioner of the technology. Optimally, the interpreter is of the type described by Thompson, et-al, in U.S. Pat. No. 7,339, 516, issued Mar. 4, 2008; however the interpreter can be of any type that provides intuitive information for the type of visual, audible, physical or other display device that is used.

BRIEF DESCRIPTION OF THE DRAWINGS

Further features, advantages, and benefits of this invention, as well as the structure and operation of various embodiments thereof, are described in detail below with reference to the accompanying drawings. A number of applications exist for the present invention and the drawings disclosed herein are illustrative of preferred and sample embodiments of the disclosed invention and are not intended to limit the spirit or scope thereof.

DETAILED DESCRIPTION OF THE PREFERRED METHODS AND EMBODIMENTS ESSENTIAL STEPS OF THE PREFERRED METHOD

Figure 1:
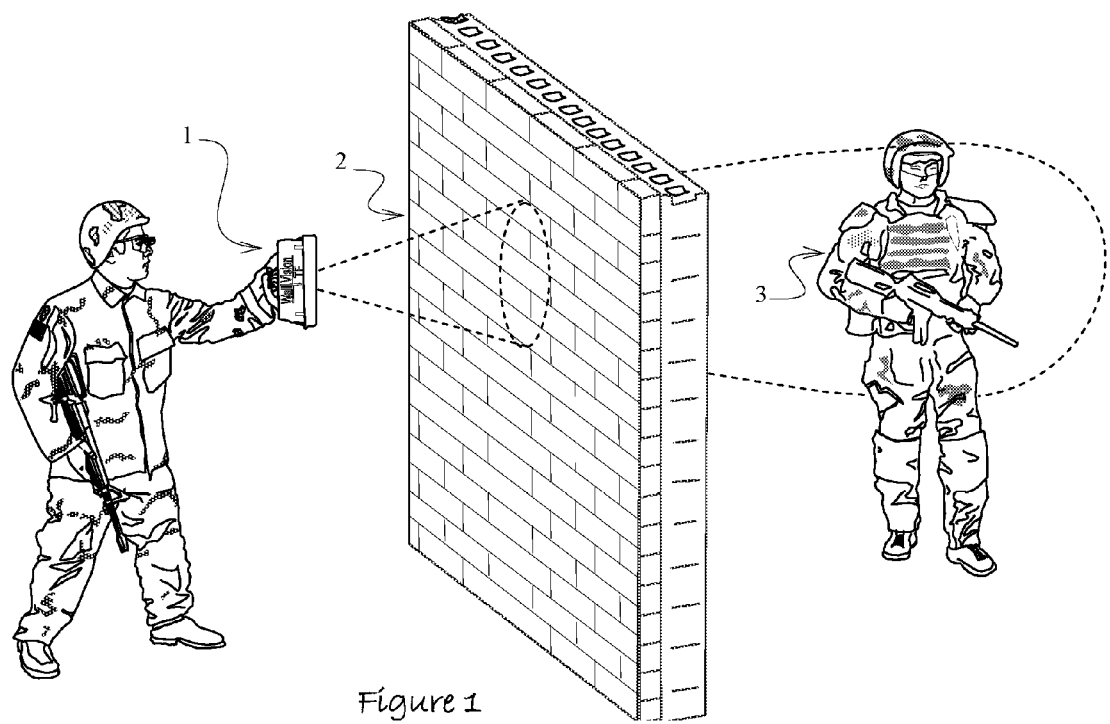
FIG. 1 displays a hand-scanning method to search for targets through walls.
Figure 2:
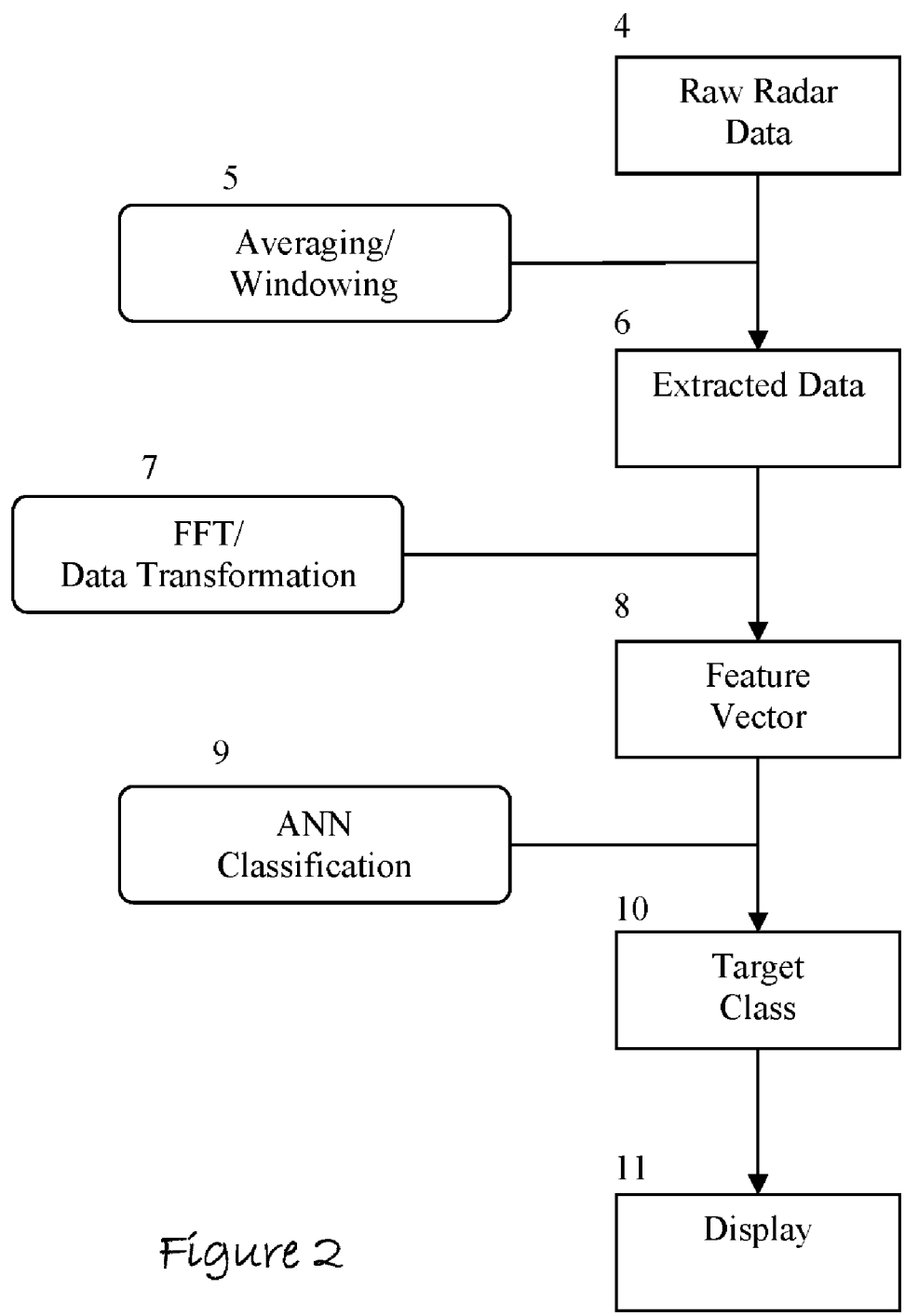
FIG. 2 outlines data flow through the system.
Figure 3:
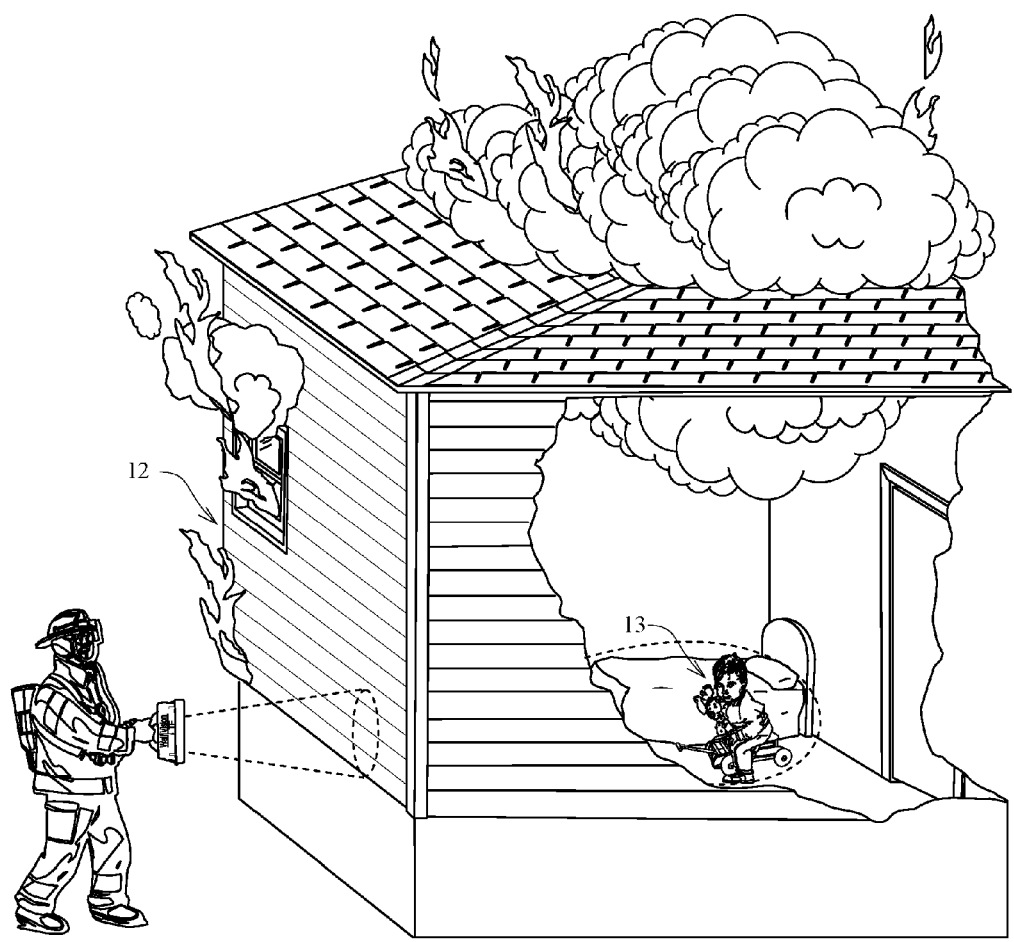
FIG. 3 displays a hand-scanning method to search for victims in a burning building.
Figure 4:
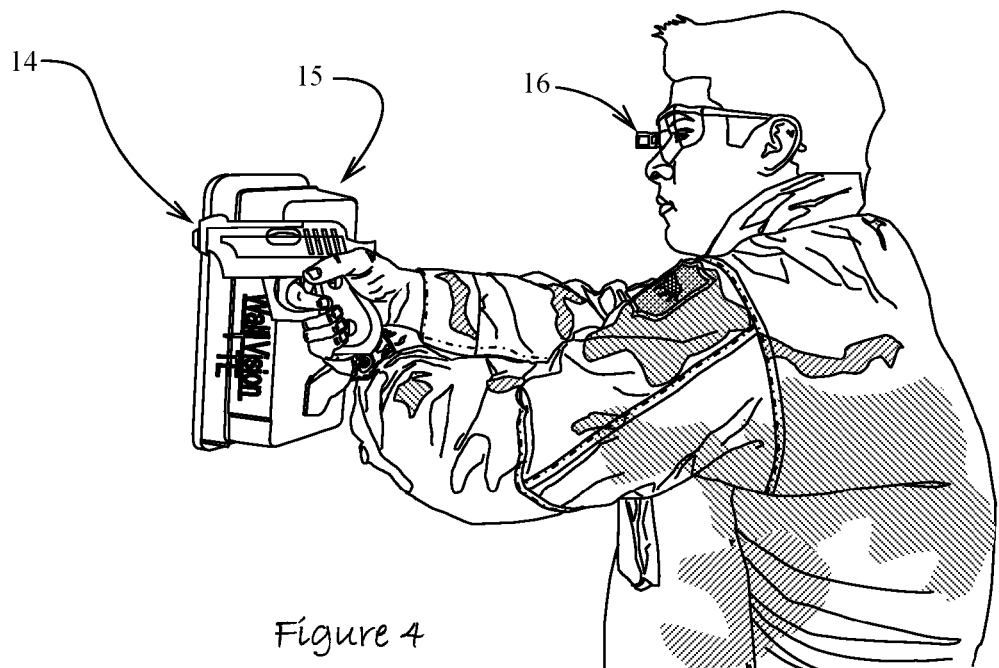
FIG. 4 displays a hand-scanning method to search for targets while operating a hand-gun.
Figure 5:
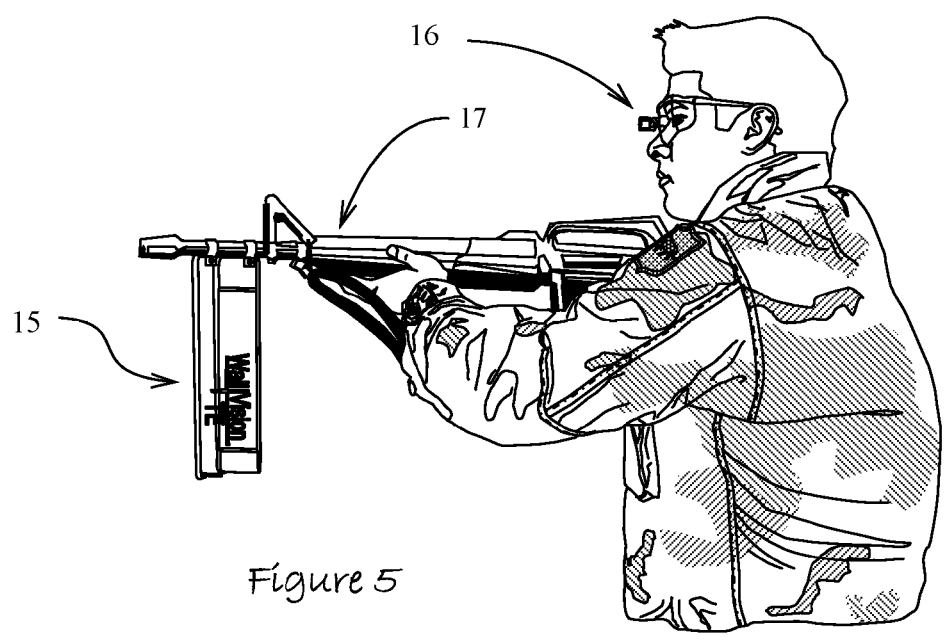
FIG. 5 displays a method to search for targets while operating an automatic weapon.
Figure 6:
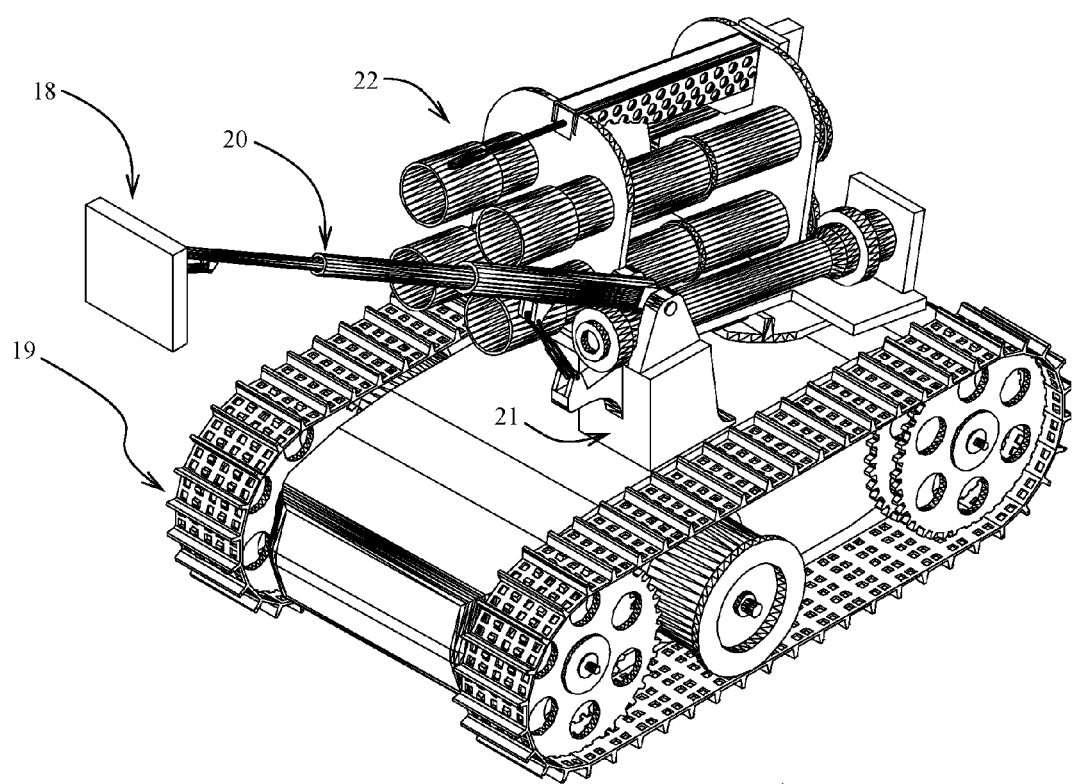
FIG. 6 displays a robot mounted embodiment of this invention.
Figure 7:
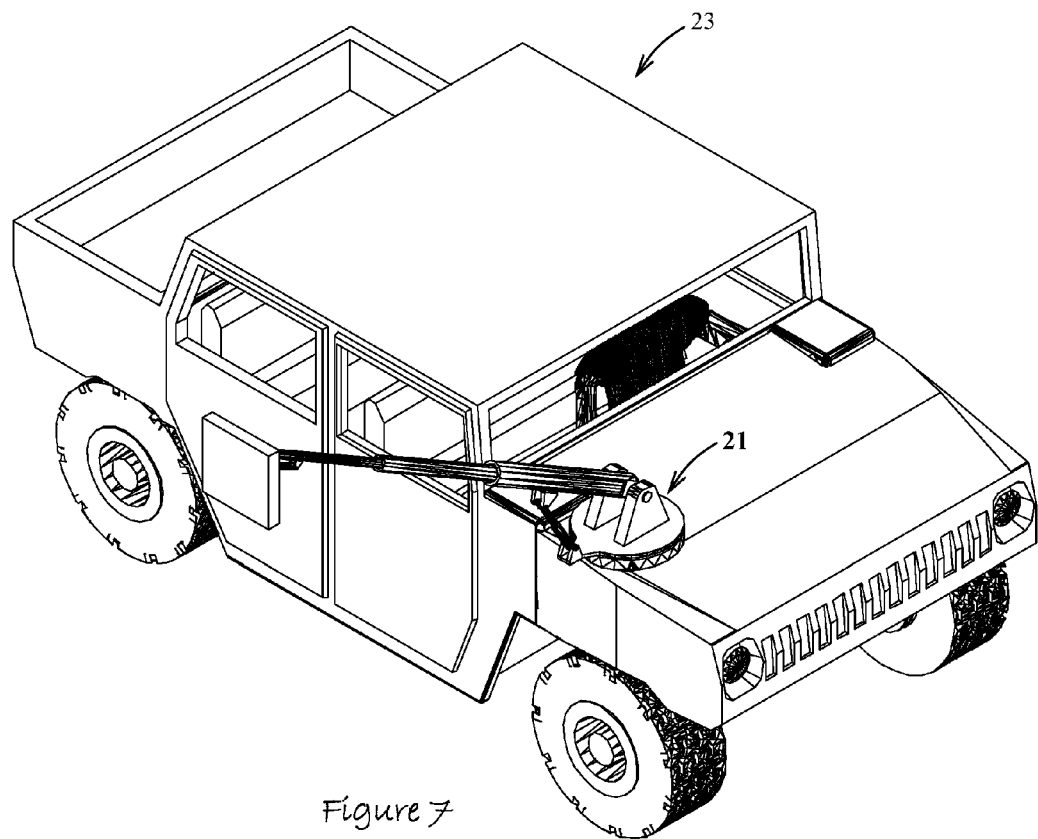
FIG. 7 displays an embodiment of this invention mounted to a military ground personnel vehicle.

Preferred embodiments of this invention are illustrated in FIG. 1 and in FIGS. 3 through 7. The preferred method of operation comprises iteratively of collecting ultra wideband radar data by aiming an assembled embodiment of this invention 1 toward a wall 2 or other opaque barrier and by horizontally and vertically swaying the unit to search for objects of interest 3 that are concealed in or by the occlusion 2. The raw radar data 4 is subsequently provided to a signal processor where signal noise reduction techniques like signal averaging 5 are applied to the same. A windowing function 5 incrementally moves over the processed radar return signal to group the entire processed signal into individual elements 6 that can be closely examined for objects of interest. As the windowing function progresses through the processed signal, its position is dynamically centered over time domain amplitude magnitude peaks in the reflected return.

A FFT 7 is computed of each incremental analysis and combined with time amplitude decay data and the propagation time position of the repositioned windowing function to form a feature information vector 8 of the windowed area 6. Automatic target recognition 9 is performed on each feature information vector to distinguish objects of interest from background clutter in each windowing function. An interpreter selects any plurality of intuitive images that are quickly and easily understood by a human operator wherein the selected images represent each target class output that is reported by the ATR with a high probability of detection. Target class 10 and background information are reported to a human operator via any plurality of display devices 11.

The act of using this invention like a flash light to scan an opaque barrier for objects of interest improves false alarm mitigation and probability of detection rates. Fire protection practitioners can use this method to search for victims 13 in burning buildings 12. This scanning method may be altered or combined with the use of hand-guns 14 in the manner shown in FIG. 4 or any other method as long as the sensor 15 is aimed toward the area that is being analyzed for targets. Audible and visual interfaces 16 that enable hands-free communication to the sensor improve the method of operation of the preferred embodiment by enabling the operator to simultaneously use hand guns 14, automatic weapons 17, the sensor 15, and other equipment. Use of audible and visual interfaces also reduces distraction to the operator. The preferred methods disclosed herein can be used to search for targets through anything that impedes vision as long as the sensor is able to penetrate the occlusion; the occlusion can also include rain, snow, fog, dust, darkness, distance, open air and fire.

Vehicle and robot mounted embodiments of this invention can be used to search through walls, through the subsurface, and along roadways. These embodiments can be used to search for improvised explosive devices (IED), human targets, animals, weapons, and most other types of targets that are discernable by RF sensing. Any plurality of sensors of the type that are disclosed herein 18 can be mounted onto remotely operated robotic or other unmanned ground combat vehicles (UGV) 19, manned HUMVEE or other military ground personnel transport vehicles 23, law-enforcement vehicles, search and rescue vehicles, and fire protection vehicles. It is possible to improve the probability of reliable target detection by adding multiple embodiments of this invention 18 around the vehicle to provide ubiquitous coverage; however, the preferred method employs a telescoping mounting apparatus 20 on a rotating platform 21 that can aim the device and move it away from ferric clutter on the vehicle such as weapons 22. It is also beneficial to hold the antenna that comprises the apparatus as still as possible. Performance improvement is further realized if the mounting apparatus does not interfere with sensor performance; non-ferric mounting systems are preferred. One skilled in the art of physical optics will appreciate that careful placement of the pan and tilt angle of each antenna 18 is needed to maximize the amount of energy that is directed toward the analyzed region while ensuring that the critical angle is not exceeded. Detection performance is greatly deteriorated if the critical angle for the wavelength employed by the system is exceeded.

Use of Artificial Neural Networks in the Preferred Method

The preferred embodiment of this invention employs ANN classification, which is an architecture that is based largely on the human thought process [15, 16]. The scheme bears a strong resemblance to the biological structure of the human brain and hence conventional terms that are used to describe the model are borrowed from the science of neurology. While differing types of ANN architectures are more suitable for select applications [17, 18], the performance of the model is largely attributable to the quality of the feature information vectors that are provided to it. ANNs employ specialized hardware and software to emulate multiple layers of elemental thought processing elements of the brain called neurons to form a trainable "black box" that can learn to recognize almost anything. Biological neurons 26 are comprised of four basic components, which are namely dendrites, soma, axon, and synapses. Dendrites accept inputs 24, which are processed by soma 25. Axon 27 turns the processed inputs into outputs and the synapses 28 serve as electrochemical contacts between other neurons. Each neuron structure 26 receives inputs from other neurons, combines them, performs a generally nonlinear operation on the result, and then reports them to the remaining neurons on the interconnected network.

Figure 8:
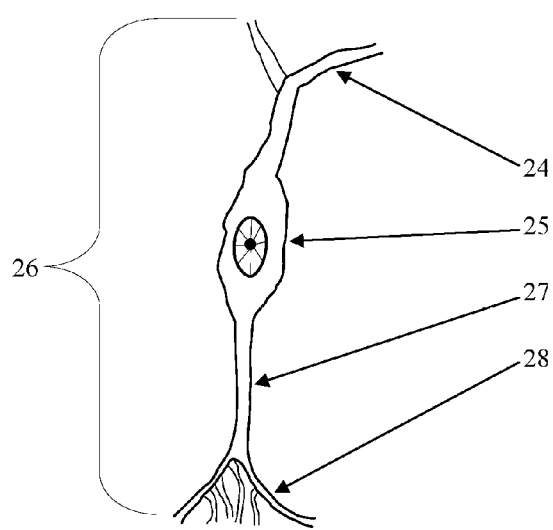
FIG. 8 displays the basic structure of a biological neuron.
Figure 9:
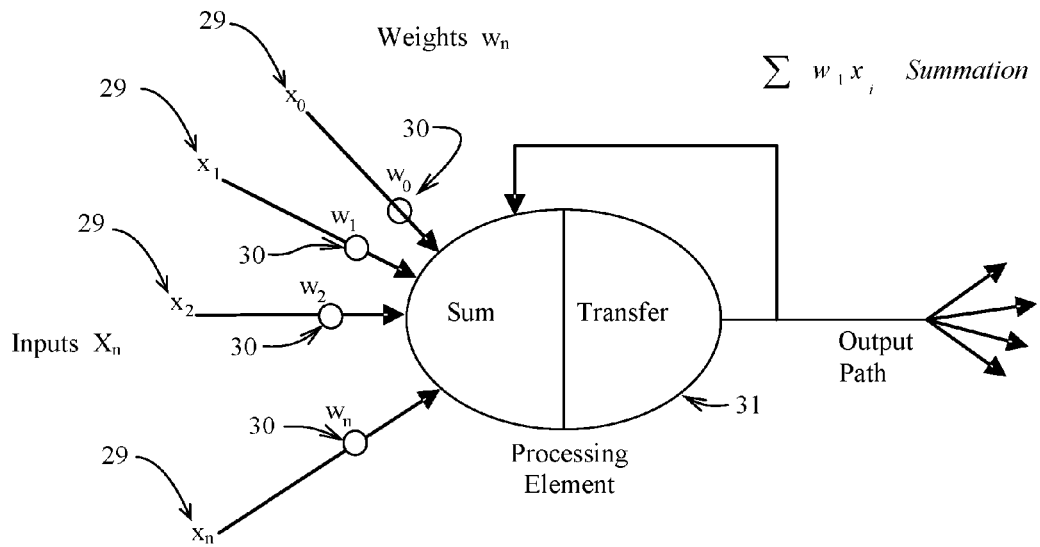
FIG. 9 illustrates the basic components of an artificial neuron.

An artificial neuron, which is the elemental component of the ANN, employs summations to emulate the four basic functions of the structure shown in FIG. 8. This over simplified model of the biological neuron is illustrated in FIG. 9. In this example, each input 29 to the network is represented by the term $x_n$. Each input value, $x_n$, is multiplied by a connection weight 30, $w_n$, and in the simplest case, these products are summed, passed through a transfer function 31, and reported to the network. ANNs are formed by clustering these primitive artificial neurons into interconnected layers.

Figure 10:
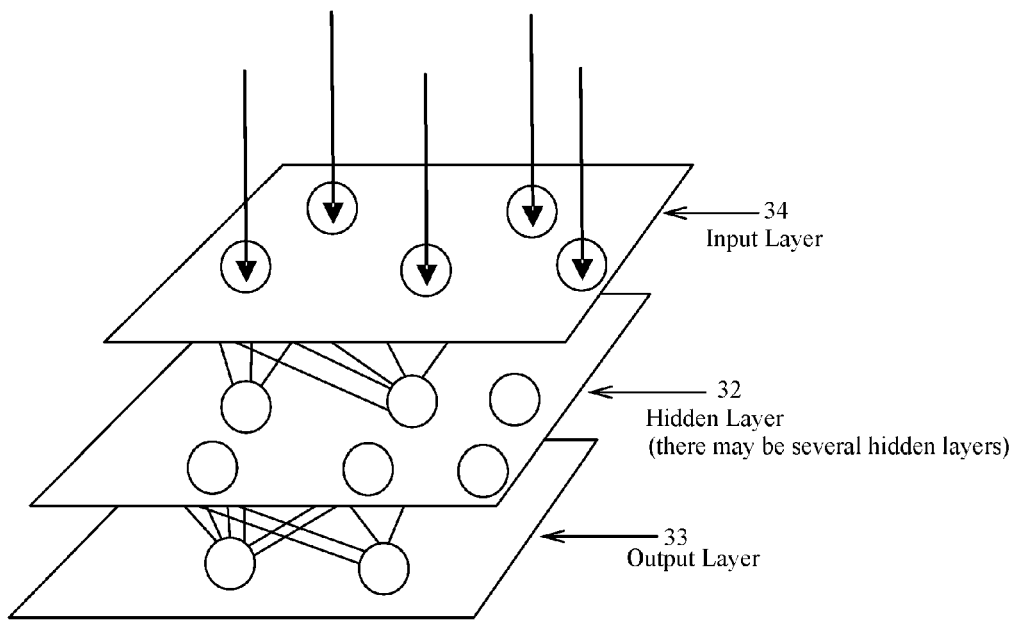
FIG. 10 displays the topology of an artificial neural network.

While the method of interconnectivity may differ among ANNs, the structure, illustrated by example in FIG. 10, remains consistent and is generally comprised of an input layer 34, one or more hidden layers 32, and an output layer 33. The function of each layer in the disclosed method and approach is relatively straight forward; the input layer accepts feature vectors from the signal processing method and feeds the same into the network, the hidden layer(s) iteratively process these data until a certain condition is satisfied or until the output layer is invoked and fires a report to the data dissemination module. When implementing this invention, it is important to note that excessively large networks, though able to approximate more complex decision boundaries, are easily over-trained. The foregoing leads to an over-fitting of the training data that causes cluster boundaries to incorporate noisy or outlying points into target class regions. The problem induces poor generalization that surfaces in the form of poor performance on select independent validation sets and can lead to ATR difficulties in learning new data [11].

Figure 11:
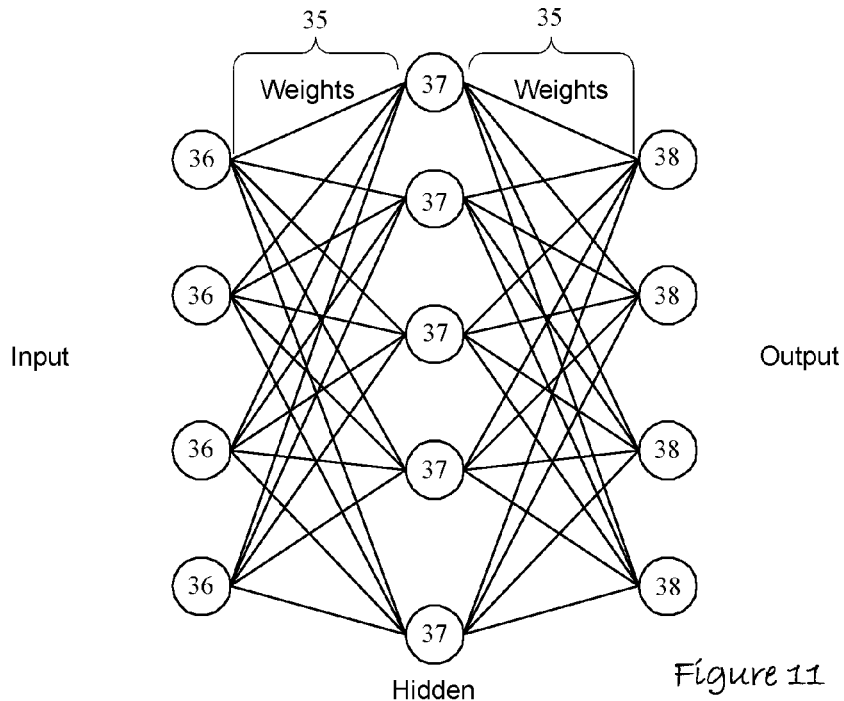
FIG. 11 displays the layout of a backpropagation neural network.

The preferred method of this invention relies on a back propagation architecture, which employs information about relative error in addition to reinforcement data to adjust connection weights within the network. Back propagation networks, illustrated in FIG. 11, are feed-forward nets with at least three layers of nodes; an input layer 36, any plurality of hidden layers 37, and an output layer 38. The number of neurons in the input layer is generally dictated by the number of features in the feature vector. For example, if the feature vector comprises thirty-one DFT magnitude values, then the ANN should have thirty-one input neurons. The number of nodes 37 in the hidden layers and the number of layers in this group are dictated largely by the complexity of the target recognition problem. The third and final layer of neurons 38, the output layer, holds a neuron for each class in the feature space. All neurons in adjacent layers are fully connected to each other by connections that hold values called weights 35.

Figure 12:
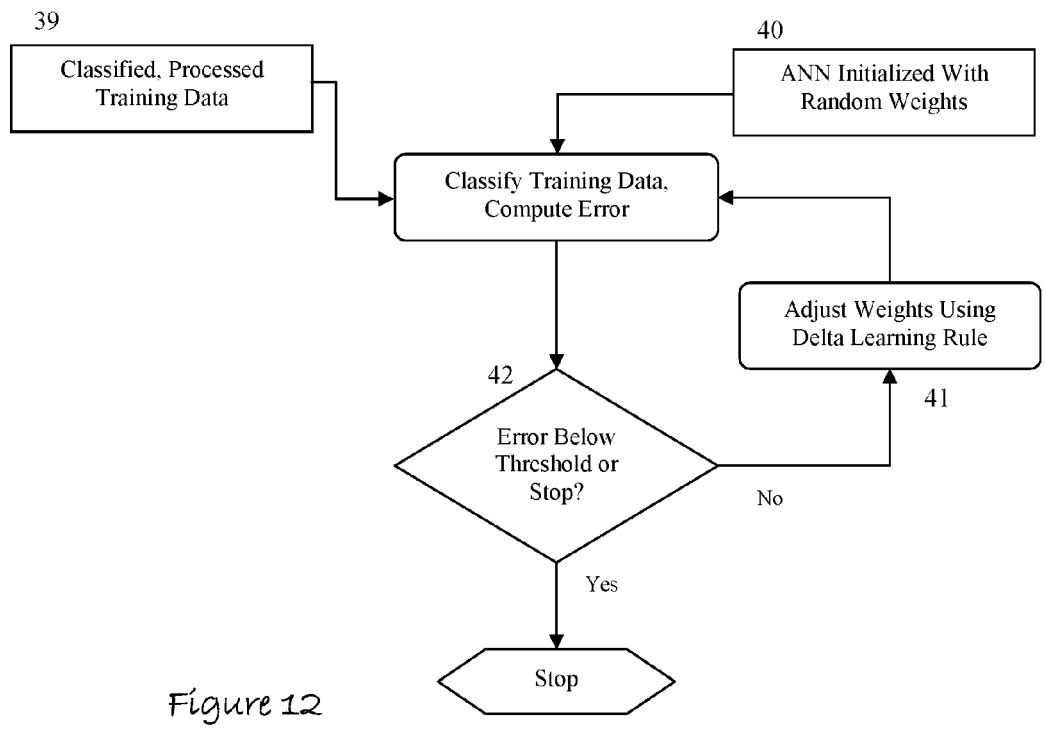
FIG. 12 displays a general flowchart for training an Artificial Neural Network.

The use of a back propagation ANN or any other connection based classifier in the preferred method relies on a learning procedure to adjust the connection weights 30 until the ATR reliably discriminates objects of interest from background clutter. A flow of this procedure is illustrated in FIG. 12 and begins by initializing the weights to a set of small random values 40. Target samples are subsequently collected and supplied to the network as pre-classified data sets 39. The network iteratively applies a generalized delta learning rule 41 to incrementally adjust the connection weights until the overall classification error falls below a specified threshold or other stopping-condition 42. Regardless of the ATR method used, the learning procedure of the preferred method optimally collects and uses sensor samples of targets and background clutter that are similar to the expected target environment for the system.

One skilled in the art will understand the impact of having too many or too few hidden layer nodes in a neural network. Too many hidden nodes or layers may result in an over-fitting of decision boundaries. By contrast an insufficient number of hidden nodes or layers may prevent the network from correctly partitioning the feature space as it is being trained. For relatively simple RF signature classification challenges with less than ten output classes, a single layer with less than twenty nodes provided an optimal tradeoff between characterization performance and computational burden [11]. The complexity of the hidden layers increases with the complexity of the training environment and the accompanying problem size. For example, a target detection system that is used to find human targets in air may have very few object classes to characterize and will have a relatively low number of hidden nodes [11]. By contrast, a system that must characterize human targets through a high variety of opaque materials such as granite, soil, foliage, and building walls will have a higher number. The additional challenge of weapon identification and other tactical target classes will further increase the number of nodes and layers.

Signal Analysis and Feature Information Construction

One of the most critical components of any target characterization method lies in the selection and specification of the feature information vectors that are fed to the automatic target recognition network. In the preferred embodiment of this invention a sliding windowing function incrementally scans the entire digitized reflected signal 43 and an FFT of the signal energy in each incremental window is computed 44. Unlike prior art, the preferred embodiment effectively slides a windowing function through the entire signal in small steps 45 so that all parts of each sample 48 are scanned. This approach enables the ATR to recognize target echoes and empty parts of the scan (no target present), which can be used to improve rejection of false positives.

A subset of the frequency spectrum values in each windowing function are scaled and averaged for the entire data set and the resulting spectral amplitude coefficients are included in the feature information vector. In an optimal embodiment of this invention, the propagation time and a scaled averaged subset of the time-domain amplitude decay response at the position of each incremental windowing function serve as orthogonal components that complete the input feature vector that is provided to the machine classifier. Phase information 50 may improve ATR performance if sufficiently high-quality sampling hardware is used to digitize the signal. The combined approach of this optimal embodiment merges the benefit of time and frequency domain advanced signal processing methods to optimize the signal to noise ratio to yield clean target feature vectors that fully utilize the capacity of ATR.

Figure 15:
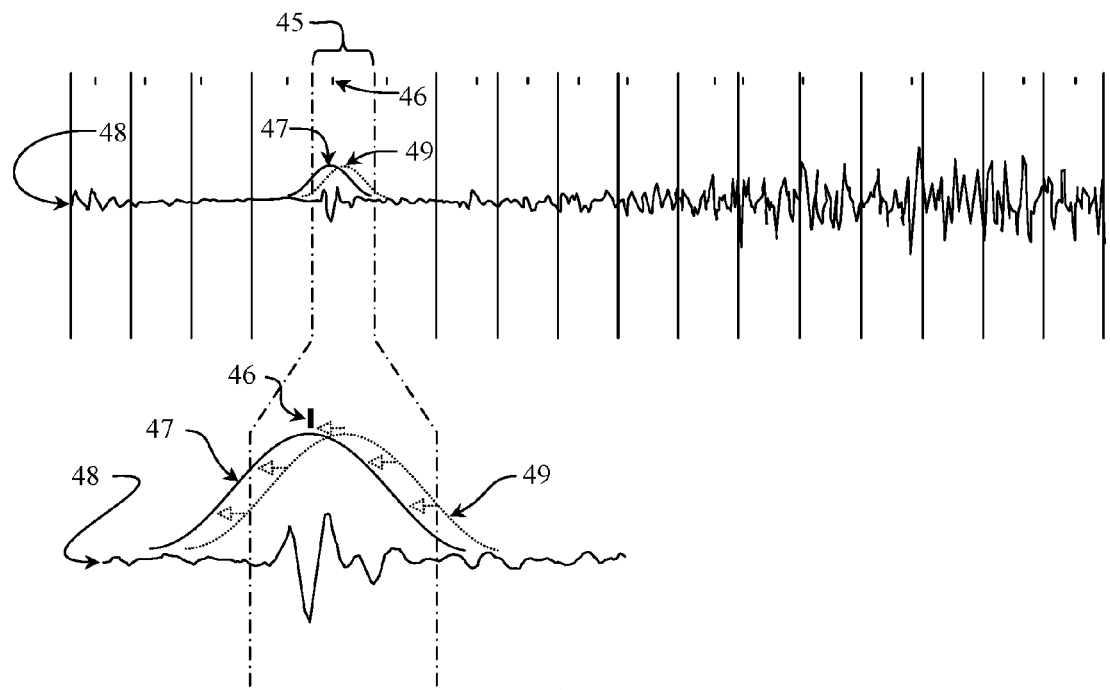
FIG. 15 displays a dynamically repositioned windowing function over a signal peak disturbance.
Figure 16:
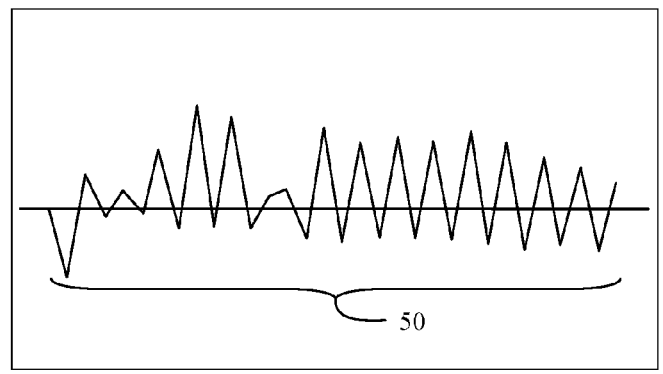
FIG. 16 displays the phase response of a target reflected radar signal.

In the preferred method of this invention an optimal gain curve is applied to the radar return data and all of the scans in the image are averaged to isolate peak positions in the data, which typically indicate a target. This invention relies in part on the foregoing to improve target characterization is by moving the original position of the Hamming Window from the center of each windowing function to the center of the largest signal disturbance within that segment. This dynamic positioning scheme is illustrated in FIG. 15. The original incremental positions of the windowing function as it is moved across the radar data lie centered between the long vertical lines that divide the signal in FIG. 15; a typical time-domain slice with a prominent signal disturbance is illustrated at 45. As the time-domain segment at 45 is approached by the windowing function, a statistical inference is used to locate the time position in that segment that has the highest signal magnitude; one such peak position is highlighted by a tic mark at 46. Similar tick marks in FIG. 15 represent peak disturbances that were found in each segment throughout the signal 48. In this example the windowing function in the time-domain segment at 45 is moved from the original center of the analysis 49 to the center of the peak disturbance 47.

SPIRIT AND SCOPE OF METHODS

At the time of this disclosure, a back-propagation neural network was the most optimal method of automatic target recognition (ATR) based on a combination of high probability of detection rates and a correspondingly low probability of type I and type II reporting errors [14, 15]. The approach and method disclosed herein has been shown to perform at sensor to target ranges of up to 21 meters with a 93% reliable probability of detection from a standoff distance of 12 meters to the nearest obstruction between the target and the radar. Calculations show that improved directivity, transmitted energy quality, and dynamic sensor range can readily increase the total effective range of the sensor to 150 meters. The neural based embodiment disclosed herein, however, does not limit the scope or spirit of this invention to connection based networks or any other type of ATR method. Most ATR assisted examinations of the feature vectors resulting from the methods that are disclosed herein will reliably discriminate objects of interest from background clutter when the preferred apparatus is used to collect target data.

The use of one tic mark in each time-domain segment in the windowing function example from the previous section is illustrative and is not intended to restrict the scope or spirit of this invention. While the preferred approach uses one windowing function during each incremental analysis, any plurality of windowing functions can be used ensure analysis of multiple targets in each time-domain segment or to ensure windowing function overlap throughout the entire signal. The spirit and scope of this invention also encompasses adjustments to windowing function size and to the incremental size of each time-domain step to improve signal discrimination and target characterization results.

COMPONENTS OF THE PREFERRED APPARATUS

Figure 17:
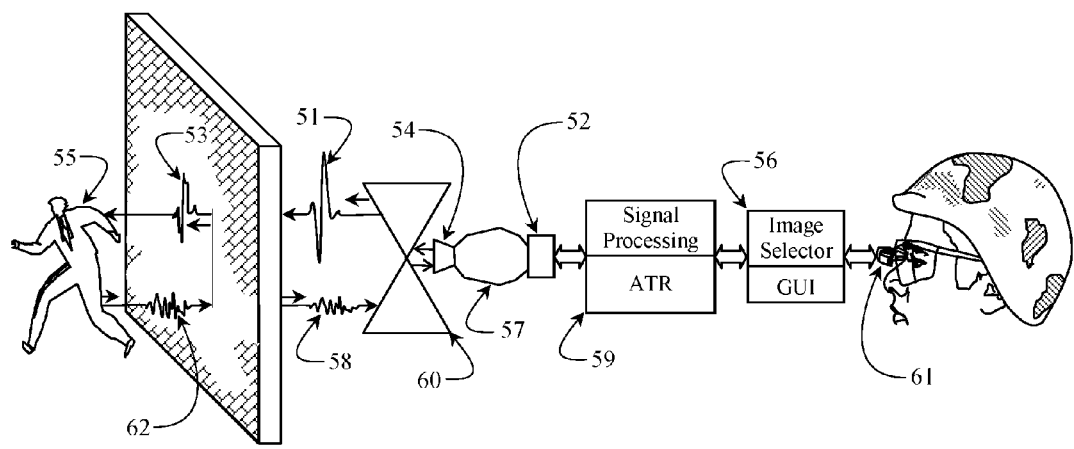
FIG. 17 displays a block diagram of a preferred embodiment of this invention.

The essential components of the preferred embodiment are shown in the block-diagram in FIG. 17. The minimum components that are needed to assemble the preferred apparatus include any plurality of ultra-wideband antennae 60; transceiver electronic circuits 54 that are capable of transmitting ultra-wideband impulse signals 51 and receiving and amplifying weak ultra-wideband signals 58 that are reflected off of the target 55 or the target area; electronic circuits that are able to digitize the amplified signals 57; a high-speed interface to bridge the digitized signals to a signal processing module 52; a signal processing module comprised of electronic circuits that condition the digitized signals through averaging, sliding windowing functions, FFT, and other methods 59; electronic circuits and software methods that perform automatic target recognition (ATR) on the processed signals 59; and electronic firmware 56 that selects an intuitive target image to send to a display unit based on the output of the ATR 59.

Figure 13:
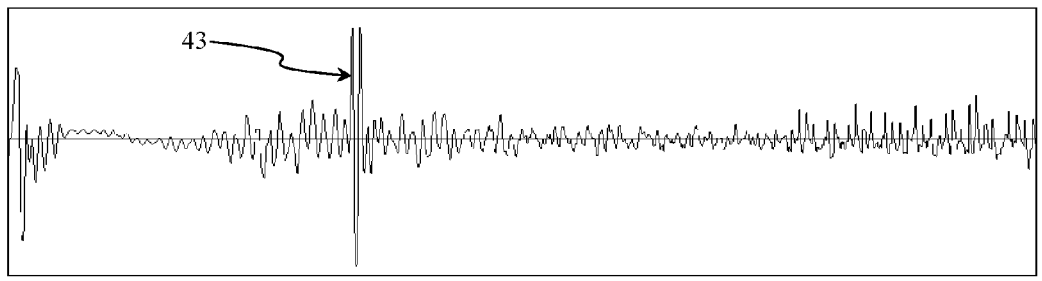
FIG. 13 displays a scaled averaged time-domain amplitude response.
Figure 14:
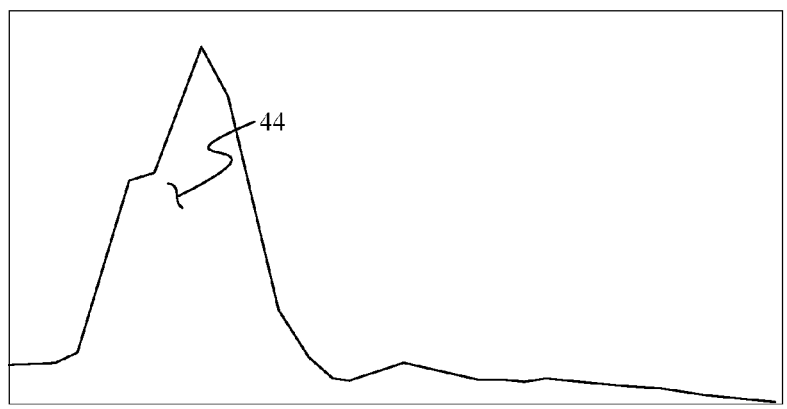
FIG. 14 displays the frequency response of a target reflected radar signal.

The disclosed method and apparatus employs a substantially broadband Gaussian shaped pulse that exhibits higher spectral energy density levels around a center frequency. Although most of the information that describes the target is contained in the phase component of the signal, the low sampling accuracy of high-speed sequential architectures interferes fervently with the stability of phase measurements in the radar return data. This problem is clearly evident in the phase component 50 of the target reflection in the scaled averaged sample shown in FIG. 13, which was originally digitized by a high-speed sequential receiver. The target in this example was a human subject at a range of 12 meters; a high-speed sequential sampler was used to digitize the UWB reflected signal. It is important to note that the relative simplicity of the high-speed sequential sampling systems that are commonly used by conventional UWB receivers falls short of the sensitivity requirements of a system that must penetrate, detect, and characterize targets through complex and highly attenuative inhomogeneous opaque media. Accordingly, a more optimal alternative is to combine a flat frequency spectrum impulse with a flash sampling scheme to provide a more reliable phase component in the signal to improve resolution.

Figure 18:
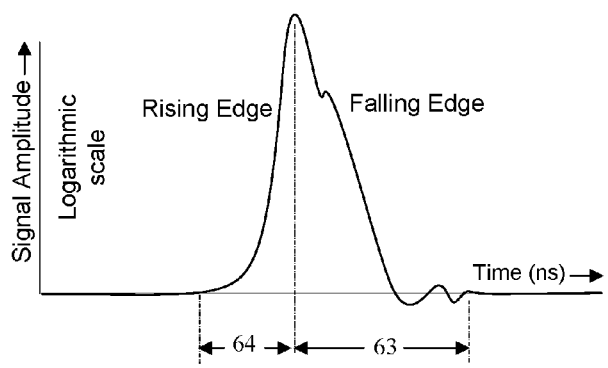
FIG. 18 displays a time-domain amplitude signature of an ultra-wideband mono-pulse.

The transmitting electronics in the transceiver 54 must be capable of generating low-noise pulses like those shown in FIG. 18 to minimize noise contributions to the reflected signal. At the time of this disclosure, a clean pulse with a rise time 64 that is on the order of 500 picoseconds or less and a fall time 63 of 5-10 nanoseconds or less provided adequate signal clarity for ultra-wideband target characterization of IED, human, animal, and hand weapon sized targets. Target characterization reliability in increasingly complex environments will accompany transmitter improvements that reduce both the rise time 64 and fall time 63 of the transmitted pulse. The transmitting electronics should also support a pulse repetition frequency (PRF) on the order of 50 kilo-pulses-per second to support real-time target detection and characterization. However, lower PRF values may be used to extend battery life when the sensor 15 is used for extended remote operations.

At the time of this disclosure, the optimal operating frequency range of the antennae 60 and transceiver circuitry 54 was on the order of 300 MHz-1100 MHz with a median bandwidth of 1000 MHz. To fully sample these signals, the digitizing hardware must be capable of sampling on the order of at least 2.2 gigasamples per second. Any improvements to sampling accuracy, signal noise mitigation, and dynamic sensor range are directly correlated to false alarm mitigation and improved probability of detection. It is possible to improve sensor performance at close range by using state of the art advancements to antenna design, like those described in [19] and in U.S. patent application Ser. Nos. 10/906,997, filed on Mar. 15, 2005, 10/908,497, filed on May 13, 2005, and 10/908,907 filed on May 31, 2005, while remaining within the scope and spirit of this invention. The foregoing and any other present or future antenna improvements are suggestions that may improve sensor performance and are not claimed individually to be a required component of or to fall within the scope and spirit of this invention.

The basic components listed in FIG. 17 are meant to illustrate a hand-portable embodiment of this invention. The preferred embodiment shown in FIG. 17 also illustrates a graphic user interface 56 that causes a helmet mounted display screen 61 to display target information in front of the eye of the operator. It is within the scope and spirit of this invention to use any type of audible, visual, or physical user interface in place of the heads-up display 61 that is shown in FIG. 17.

As previously stated, an embodiment of this invention may use an interpreter of the type described by Thompson, et-al, in U.S. Pat. No. 7,339,516, issued on Mar. 4, 2008. However, the foregoing is illustrative and is not intended to restrict the scope of this invention to any particular type or combination of target interpretation methods or embodiments. The method and apparatus disclosed herein of using an interpreter to select an intuitive image based on ATR output is not restrictive to a specific format such as sound, vibration, visual images, and the like. The purpose of the interpreter is to select any type of image based on ATR output and to subsequently convey target and background information that is easily and rapidly understood. The spirit and scope of this invention encompasses any method of reporting ATR output from any embodiment of this invention and is not limited solely to embodiments of this invention that rely on an interpreter to disseminate ATR output.

What is claimed is:

1. A method that uses ultra-wideband RF energy to detect objects of interest that comprises in combination;
  (a) transmitting repetitive bursts of ultra-wideband RF impulses in the direction of a target area to search for objects of interest,
  (b) receiving and amplifying signals that are reflected from objects of interest and background clutter in the target area, (c) converting the said received and amplified signals into digital form, (d) performing signal processing functions on said converted signals to reduce noise in the digitized data, (e) incrementally analyzing each said signal processed radar return with a windowing function wherein said window function is moved and performed across the entirety of each processed radar return, (f) calculating any plurality of domain parameters from each said windowing function and using calculated values to extract target specific feature information that distinguishes objects of interest from background clutter, (g) outputting said target feature information into an automatic target recognition method that distinguishes objects of interest from background clutter in the feature information, (h) reporting object class output from said automatic target recognition method to a display device.

2. A method of claim 1 that transmits repetitive bursts of low-noise RF impulse energy wherein the rise time is less than 500 picoseconds and the fall time is less than 10 nanoseconds.

3. A method of claim 1 that performs averaging signal processing functions on the time-domain reflected signal to improve the signal to noise ratio.

4. A method of claim 1 that performs averaging signal processing functions on the Fourier transform of the reflected signal to improve the signal to noise ratio.

5. A method of claim 1 that incrementally signal processes each reflected radar return with an overlapping sliding windowing function.

6. A method of claim 1 that incrementally signal processes each reflected radar return with a non-overlapping sliding windowing function.

7. A method of claim 1 that dynamically positions each said windowing function over time-domain amplitude peaks in each said incremental analysis of the reflected radar return.

8. A method of claim 1 wherein any plurality of windowing functions are used to analyze any plurality of time domain slices in the signal processed radar return signal.

9. A method of claim 1 wherein the size of any windowing function is adjusted to improve signal discrimination and target characterization results.

10. A method of claim 1 wherein the size of any time domain slice is adjusted to improve signal discrimination and target characterization results.

11. A method of claim 1 that calculates a Fourier transform on each said windowing function and uses the calculated Fourier transform to select target specific feature information that distinguishes objects of interest from background clutter.

12. A method of claim 1 that calculates time amplitude decay data statistics on each said windowing function and uses the calculated data statistics to select target specific feature information that distinguishes objects of interest from background clutter.

13. A method of claim 1 that calculates the propagation time position of each said windowing function and uses said propagation time position to select target specific feature information that distinguishes objects of interest from background clutter.

14. A method of claim 1 that calculates any combination of the Fourier transform, time amplitude decay, and the propagation time position of each said windowing function and uses said calculated data to select target specific feature information that distinguishes objects of interest from background clutter.

15. A method of claim 1 wherein the said windowing function is a Hamming window.

16. A method of claim 1 wherein the said windowing function is a Hamming window.

17. A method of claim 1 wherein the said windowing function is a Gaussian window.

18. A method of claim 1 wherein the said windowing function is an asymptotic window.

19. A method of claim 1 that reports object class output from said automatic target recognition method by selecting an image of any type that intuitively represents the object class that was reported with the highest probability of detection.

20. A method of claim 19 that comprises a visual representation of the presence and type of target that is characterized in the reflected radar signal data.

21. A method of claim 19 that comprises an audible representation or indication of the presence and type of target that is characterized in the reflected radar signal data.

22. A method of claim 19 that comprises in combination any plurality of visual, audible, or physical representation or indication of the presence and type of target that is characterized in the reflected radar signal data.

23. The method of claim 1 wherein the feature information is time-amplitude or frequency based.

24. The method of claim 1 wherein the feature information is used to distinguish any plurality of target classes.

25. The method of claim 23 wherein the feature information is one-dimensional, two-dimensional, or multi-dimensional.

26. The method of claim 1 wherein automatic target recognition comprises neural network classifiers.

27. The method of claim 1 wherein automatic target recognition comprises cluster classifiers.

28. The method of claim 1 wherein automatic target recognition comprises statistical classifiers.

29. The method of claim 1 wherein automatic target recognition comprises rule based classifiers.

30. The method of claim 1 wherein automatic target recognition comprises fuzzy based classifiers.

31. The method of claim 1 wherein automatic target recognition comprises hybrid classifiers.

32. An automatic target recognition method of claim 1 that further comprises;

(a) calculating data statistics from feature information input, (b) using a selector to use calculated data statistic output values to select target feature information to distinguish specific target classes from background clutter wherein each target class uniquely describes a target for recognition purposes, (c) using a classifier to use target specific feature information to distinguish objects of interest from background clutter and to output target class data.

33. The method of claim 32 wherein the parallel hardware comprises cluster classifier architectures.

34. The method of claim 32 wherein the parallel hardware comprises statistical classifier architectures.

35. The method of claim 32 wherein the parallel hardware comprises rule-based classifier architectures.

36. The method of claim 32 wherein the parallel hardware comprises fuzzy-based classifier architectures.

37. The method of claim 32 wherein the parallel hardware comprises hybrid classifier architectures.

38. A method of claim 32 for distinguishing targets from all types of system noise and background clutter comprising the steps of;

(a) inputting data having targets, system noise, and background clutter,
(b) applying neural network learning procedures to the input data to construct a set of operators,
(c) applying the constructed set of operators to construct a set of features,
(d) choosing optimal features from the constructed set of features to distinguish targets from clutter,
(e) using the selected optimal features to distinguish targets from background clutter.

39. The method of claim 38 wherein parallel hardware is employed to distinguish targets from background clutter.

40. An apparatus that uses ultra-wideband RF energy to detect objects of interest that comprises in combination;
(a) an electronic means to generate repetitive ultra-wideband pulses at a high pulse repetition frequency wherein said transmitter electronics are coupled to any plurality of antennae that are configured and positioned to direct energy in the direction of the target area,
(c) radar receiver amplification electronics coupled to any plurality of antennae that are configured to detect signals that are reflected from the target area,
(d) sampling electronics with sufficient dynamic range and sampling bandwidth to accurately digitize reflected signals from the target area that are amplified by said radar receiver,
(e) a signal processor to perform noise reduction functions on said digitized reflected signals,
(f) electronic firmware that is properly configured to incrementally analyze each said digitized reflected radar signal return with a windowing function wherein said windowing function is moved and performed across the entirety of each signal processed radar return,
(g) electronic firmware that is properly configured to calculate transfer functions of data from each said windowing function and to use calculated values to extract target specific feature information that distinguishes objects of interest from background clutter,
(h) electronic firmware that is properly configured to report feature vectors to an automatic target recognition method that distinguishes objects of interest from background clutter in the feature information,
(i) electronic firmware that is properly configured to implement automatic target recognition,
(j) electronic firmware that is properly configured to select and report display images based on automatic target recognition output,
(k) an electronic apparatus to display target image information.

41. An apparatus of claim 40 wherein the antenna is coupled to the transmitter and is the same antenna that is coupled to the receiver.

42. An apparatus of claim 40 that comprises in combination any plurality of antennae that are operated in mono-static mode.

43. An apparatus of claim 40 that comprises in combination any plurality of antennae that are operated in bi-static mode.

44. An apparatus of claim 40 that comprises in combination any plurality of antennae that form a physical array.

45. An apparatus of claim 40 that comprises in combination any plurality of antennae that form a synthetic array.

46. An apparatus of claim 40 that comprises in combination any plurality of antennae that are operated in mono-static mode, antennae that are operated in bi-static mode, antennae that form physical array, or antennae that form a synthetic array.

47. An apparatus of claim 40 that comprises electronic hardware that forms a triggered time-domain impulse generator that produces an output pulse with a rise time of 500 picoseconds or less and a fall-time of 10 nanoseconds or less.

48. An apparatus of claim 40 that comprises an electronic oscillating signal generator with an effective frequency range of 50 Hz to 100 kHz to trigger the time-domain impulse generator of claim 38.

49. An apparatus of claim 40 wherein parallel hardware is used to calculate data transfer functions on each windowing function.

50. An apparatus of claim 40 wherein parallel hardware is used to extract target specific feature information from said calculated data transfer function values that distinguish objects of interest from background clutter.

51. An apparatus of claim 40 wherein the automatic target recognition electronics comprises parallel hardware to implement neural network architectures.

52. An apparatus of claim 40 wherein the automatic target recognition electronics comprises parallel hardware to implement statistical target classification architectures.

53. An apparatus of claim 40 that comprises in combination electronics that calculate a Fourier transform on each said windowing function.

54. An apparatus of claim 40 that employs parallel hardware to calculate a Fourier transform on each said windowing function.

55. An apparatus of claim 40 that comprises in combination electronics that calculate time amplitude decay data statistics on each said windowing function.

56. An apparatus of claim 40 that employs parallel hardware to calculate time amplitude decay data statistics on each said windowing function.

57. An apparatus of claim 40 that comprises in combination electronics that calculate the propagation time position of each said windowing function.

58. An apparatus of claim 40 that employs parallel hardware to calculate the propagation time position of each said windowing function.

59. An apparatus of claim 40 that comprises a display to provide a visual representation of the presence and type of object of interest that is characterized in the reflected radar signal data.

60. An apparatus of claim 40 that comprises a display to provide audible representation of the presence and type of object of interest that is characterized in the reflected radar signal data.

61. An apparatus of claim 40 that comprises a display to provide vibratory, thermal, or other physical representation of the presence and type of object of interest that is characterized in the reflected radar signal data.

* * * * *